(12) United States Patent
Ramsey

(10) Patent No.: US 6,813,841 B1
(45) Date of Patent: Nov. 9, 2004

(54) MEASURING DEVICE FOR TEACHING INCREMENTAL MEASUREMENTS

(76) Inventor: Linda Kay Ramsey, 6400 Ohio Dr. #1621, Plano, TX (US) 75024

( * ) Notice: Subject to any disclaimer, the term of this patent is extended or adjusted under 35 U.S.C. 154(b) by 0 days.

(21) Appl. No.: 10/337,741

(22) Filed: Jan. 7, 2003

(51) Int. Cl.$^7$ .......................... G01B 3/02; G09B 19/02; G09B 23/02
(52) U.S. Cl. ............................. 33/494; 434/195; 33/491
(58) Field of Search .................................. 33/391, 15 D, 33/483, 492, 494, 465; 434/195, 196, 205; D10/64, 65

(56) References Cited

U.S. PATENT DOCUMENTS

| | | | | |
|---|---|---|---|---|
| 330,837 A | * | 11/1885 | Judd | 33/458 |
| 387,570 A | * | 8/1888 | Traut | 403/96 |
| 569,358 A | | 10/1896 | Sommerfeldt | 33/494 |
| 1,212,549 A | * | 1/1917 | Parent | 33/465 |
| 1,608,713 A | * | 11/1926 | Anderson | 33/458 |
| 2,252,311 A | * | 8/1941 | Ware | 33/489 |
| D173,363 S | * | 11/1954 | Louis | D19/64 |
| 3,004,344 A | * | 10/1961 | Douglas | 33/341 |
| 4,566,200 A | * | 1/1986 | Brady et al. | 33/809 |
| 4,742,619 A | * | 5/1988 | Swanson | 33/474 |
| 4,778,390 A | | 10/1988 | Marans | 434/187 |
| 5,014,438 A | * | 5/1991 | Gravel | 33/494 |
| 5,746,001 A | | 5/1998 | Fisher | 33/484 |
| 5,881,469 A | | 3/1999 | Monck | 33/494 |
| 6,243,959 B1 | | 6/2001 | Monck | 33/494 |

* cited by examiner

Primary Examiner—Diego Gutierrez
Assistant Examiner—R. Alexander Smith
(74) Attorney, Agent, or Firm—Waddey & Patterson, PC; Phillip E. Walker

(57) ABSTRACT

The present invention provides a measuring device for teaching incremental measurements to a user of the measuring device. The measuring device comprises a fastener and a plurality of rulers containing graduated markings and rotatably attached to the fastener. Each ruler is positioned to horizontally align and vertically juxtaposed the graduated markings of consecutive rulers. In a preferred embodiment, the sets of graduated markings vary in numerical increment from other sets of graduated markings. Also each ruler varies in color from the other rulers of the measuring device.

2 Claims, 6 Drawing Sheets

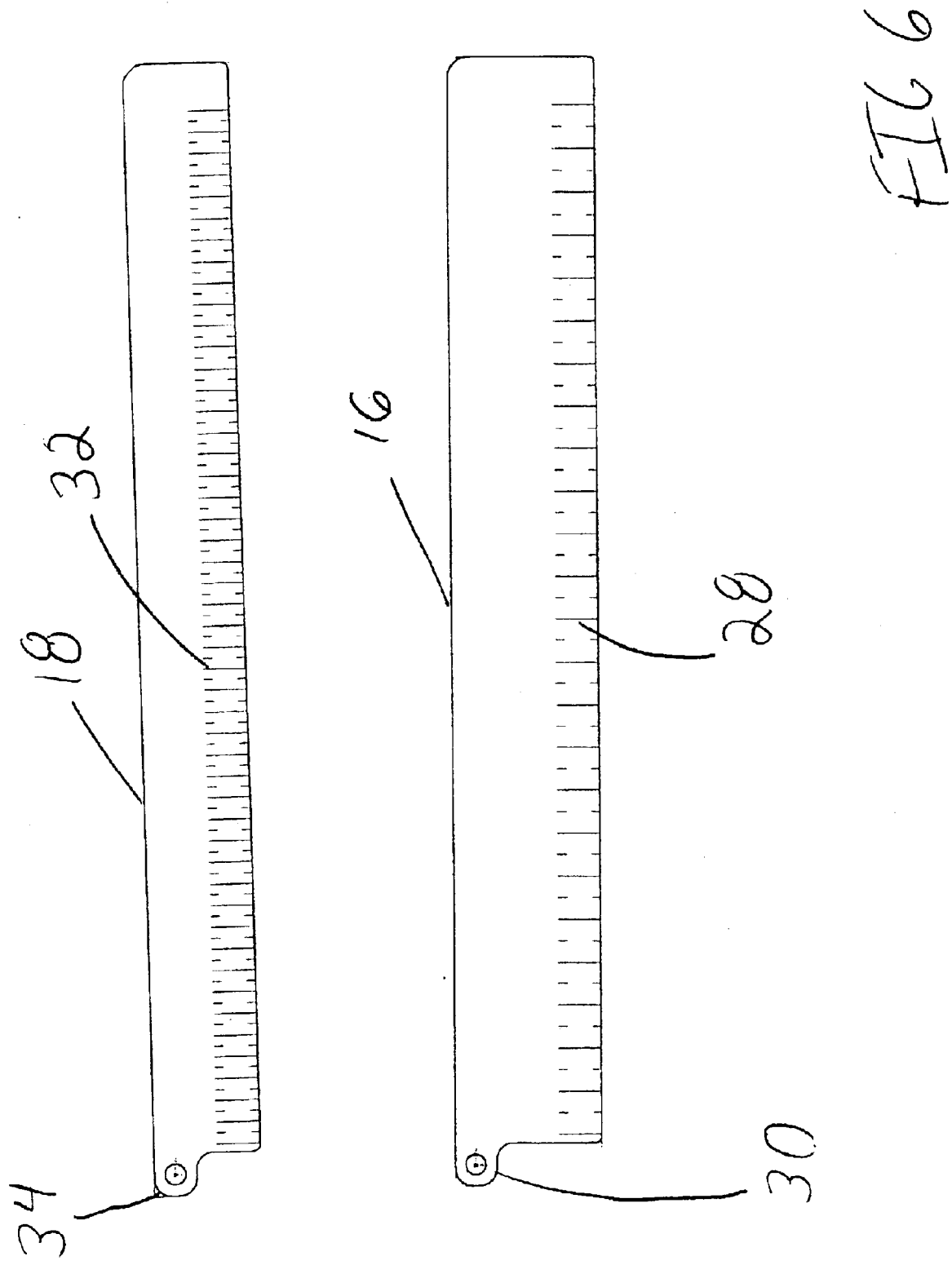

MEASURING DEVICE FOR TEACHING INCREMENTAL MEASUREMENTS

FIELD OF THE INVENTION

The present invention relates generally to a graduated measuring device, and more specifically, but not by way of limitation, to a group of graduated rulers rotatably attached to teach the interrelationship between fractional measurements.

BACKGROUND OF THE INVENTION

Several prior art designs exist that attempt to use a single device to provide multiple graduated measurement lengths. Some of these prior art designs have attempted to link multiple measurement length elements within a single measurement devices to distinguish and teach the difference in the varying incremental lengths. However, most of these prior art devices fail to adequately demonstrate the inter relationship between the difference in the incremental measurement lengths of the elements of these prior art devices.

For example, U.S. Pat. No. 569,358 issued to Sommerfeldt provides a group of rulers held together through a channel and a pintle. Each ruler has different graduated marking characteristics. However, due to the construction of the '358 patent, a user of the '358 patent experiences great difficulty in trying to compare in a single viewing plain the difference in the graduated measurement lengths.

Other prior art attempts to solve this problem have also failed. For example, U.S. Pat. No. 4,778,390 issued to Marans provides a base with several scales attached to the base apart from one another. The '390 patent fails to provide an adequate method for properly comparing the incremental measurements in different scales at the same time. Since the individual scales of the '390 patent are fixed to the base, the individual rulers cannot be positioned to teach incremental differences between the two graduated measurements on the individual scales.

Other attempts, such as U.S. Pat. No. 5,881,469 issued to Monck have attempted to use transparent sheets to overlap a base portion. The base portion and transparent sheets have contained graduated measurements in attempt to show the relationship between the various graduated measurements. This device can be cumbersome and hard to read due to the exact overlaid nature of the base and sheets comprising the device. As such, as an educational tool the difficulty in reading the device deters from its effectiveness.

Thus there is a need in the art for a measuring device for teaching incremental measurements.

SUMMARY OF THE INVENTION

The present invention provides a measuring device for teaching incremental measurements to a user of the measuring device. The measuring device comprises a fastener and a plurality of rulers containing graduated markings and rotatably attached to the fastener. Each ruler is positioned to horizontally align and vertically juxtaposed the graduated markings of consecutive rulers. In a preferred embodiment, the sets of graduated markings vary in numerical increment from other sets of graduated markings. Also each ruler varies in color from the other rulers of the measuring device.

The set of graduated markings in each ruler of the measurement device are horizontally aligned such that corresponding lengths within each graduated marking set correspond to the same graduated length in the other rulers of the measuring device. The measuring device can also be designed such that the individual rulers partly overlap but do not obstruct the view a user of the device has to all of the sets of graduated markings. This allows a user of the device to quickly discern how the individual graduated markings dimensionally correspond to other sets of graduated markings comprising the device.

Accordingly, it is an object of the present invention to provide an improved measuring device for teaching incremental measurements.

Another object of the present invention is to provide a measuring device for teaching fractional relationships between different incremental fractional measurements lengths.

Another object of the present invention is to provide a measuring device that is rotatably hinged about a central location.

Still yet another object of the present invention is to provide a measurement device with various measurement elements that are arrangeable in a stacked formation such that the graduated markings on the measurement elements do not overlap.

Still yet another object of the present invention is to provide a measurement device with various measurement elements that are arrangeable in a stacked formation such that the graduated markings on the measurement elements do not overlap and the markings are in close proximity so as to compare the different graduated markings on the measurement elements.

Yet another object of the present invention is to provide a measurement device comprising several measurement elements that are rotatably fixable in a position to allow ease of comparison of the graduated markings in the measurement device.

Numerous other objects, features and advantages of the present invention will be readily apparent to those skilled in the art, upon a reading of the following disclosure, when taken in conjunction with the accompanying drawings.

BRIEF DESCRIPTION OF THE DRAWINGS

FIG. 4 highlights the interrelationship between the graduated markings on the individual rulers of the current invention.

FIG. 5 shows the variance in the measuring element width.

FIG. 6 is an alternate view of two measuring elements of the current invention. FIG. 6 also shows the relationship of the widths to the measuring elements.

DESCRIPTION OF THE PREFERRED EMBODIMENTS

Figure 1:
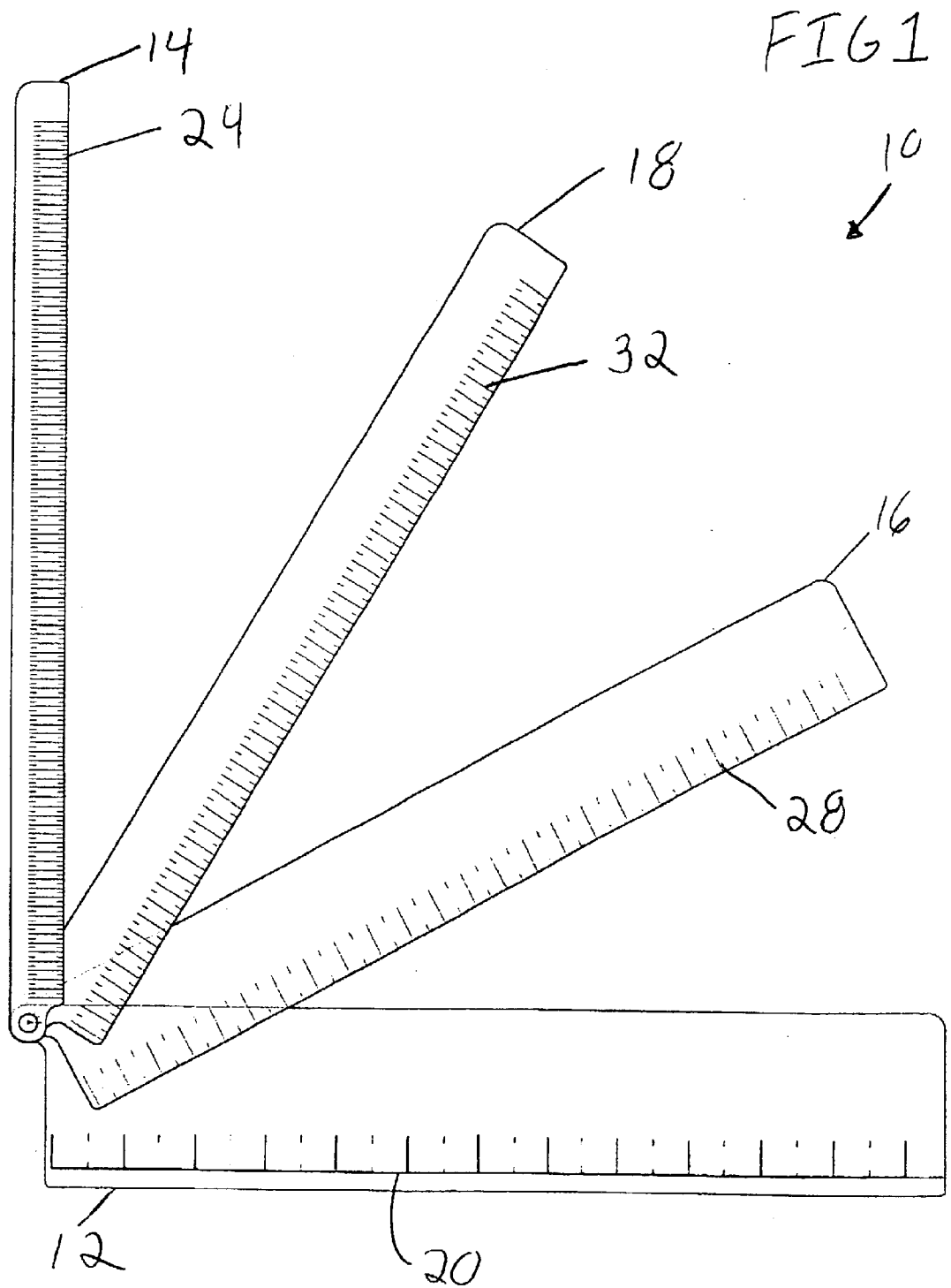
FIG. 1 is a front view of an embodiment of the present invention showing several of the measuring elements fanned out and separated from one another.

Referring now to drawings, in particular to FIG. 1, device teaching changing incremental measurements is shown and generally designated by the numeral 10. The measuring device 10 comprises a first ruler 12 and a second ruler 14 rotatably attached to the first ruler 12. In one embodiment the measuring device 10 includes a third ruler 16 and a fourth ruler 18. The first ruler 12 includes a first set of graduated markings 20 and a first protrusion 22. The second ruler 14 includes a second set of graduated markings 24 and a second protrusion 26. The second protrusion 26 is rotatably attached to the first protrusion 22 to horizontally align and vertically space the first set of graduated markings 20 with the second set of graduated markings 24.

The third ruler 16 includes a third set of graduated markings 28 and a third protrusion 30. The third protrusion 30 rotatably attaches to the first protrusion 22 and second protrusion 26 to horizontally align and vertically space the third set of graduated markings 28 with the first set of graduated markings 20 and the second set of graduated markings 24.

The fourth ruler 18 includes a fourth set of graduated markings 32 and a fourth protrusion 34. The fourth protrusion 34 rotatably attaches to the first protrusion 22, the second protrusion 26, and the third protrusion 30 to horizontally align and vertically space the fourth set of graduated markings 32 with the first set of graduated markings 20, the second set of graduated markings 24, and a third set of graduated markings 28.

The shape of each ruler 12–18 can vary according to the particular desires of the user of the measuring device 10. The rulers 12–18 can take on numerous shapes, including, but not limited to, square, rectangular, arcuate, and polygonal.

Figure 2:
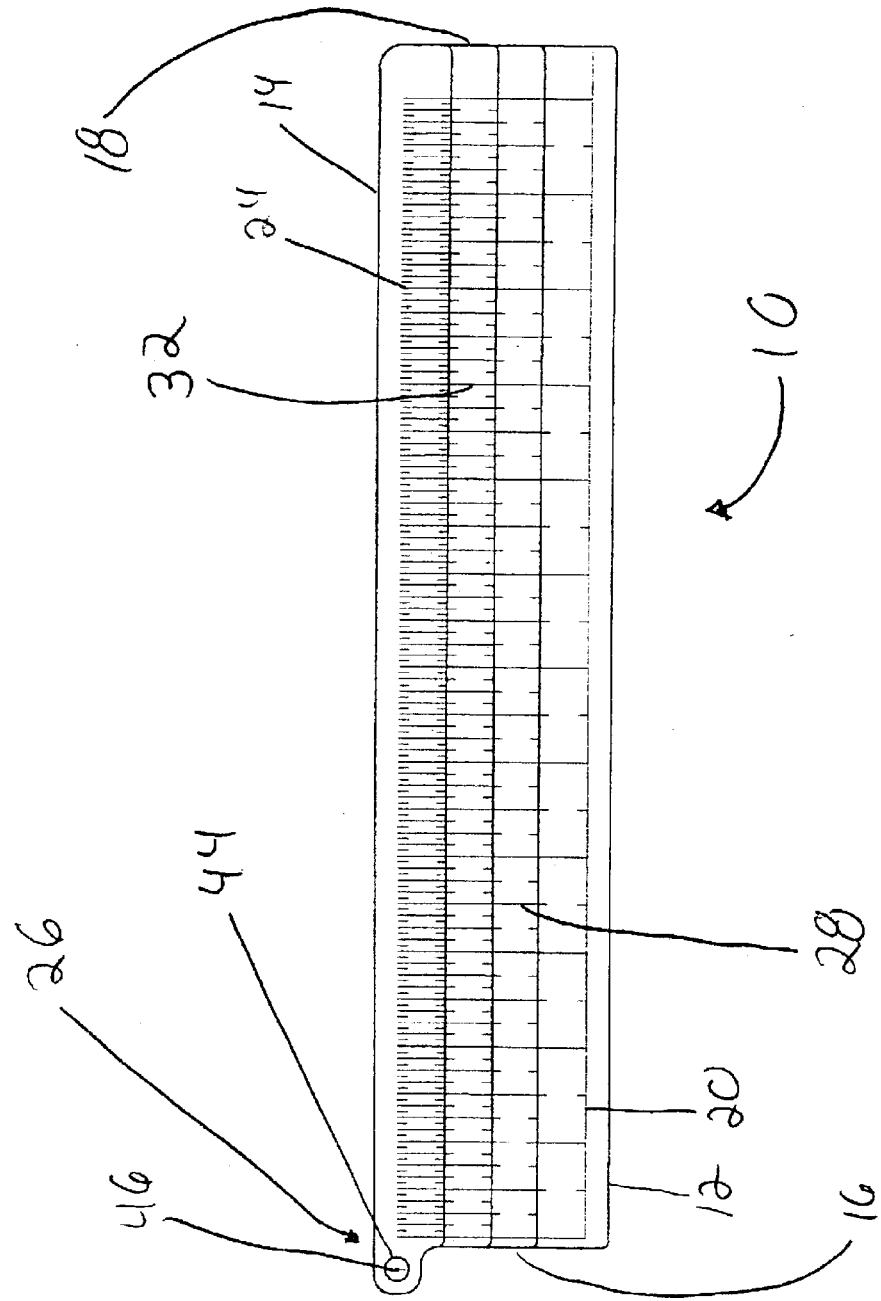
FIG. 2 is a front view of an embodiment of the present invention showing several of the measuring elements in a stacked arrangement with the graduated markings horizontally aligned and vertically separated.
Figure 3:
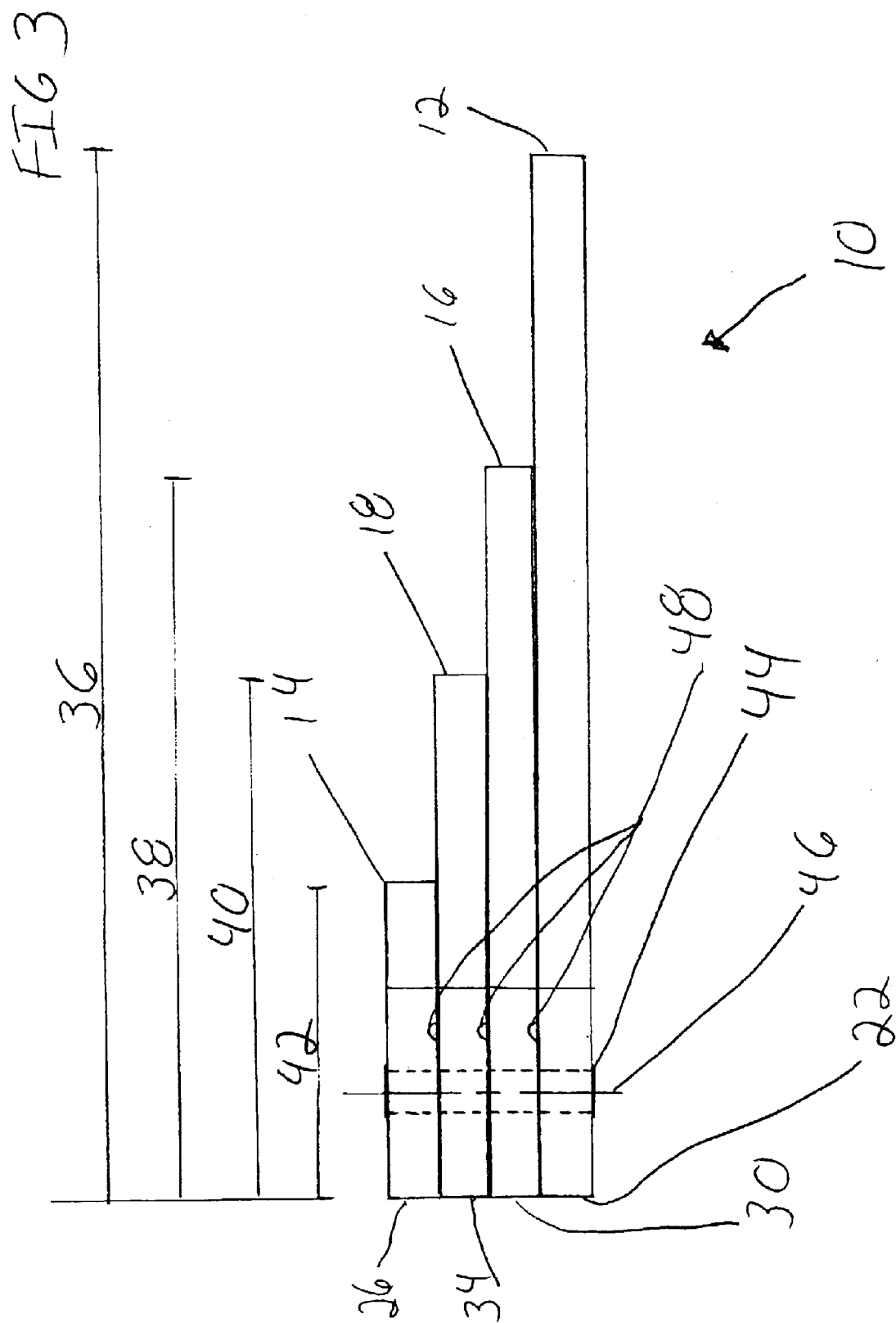
FIG. 3 is a side view of one embodiment of the current invention showing the interrelationship between the individual widths of the measuring elements

As seen in FIGS. 2 and 3, the rulers 12–18 can be rotated into such position that the individual rulers 12–18 are positioned adjacent to one another. In another embodiment, the rulers can be positioned in a stack arrangement where the widths 36–42 can vary to allow the graduated markings to be visible to a user of the measuring device 10.

The rulers 12–18 can have a uniform length to provide ease of readability and comparison of the graduated markings by a user of the measuring device 10. This is not necessary, however, and the length of the individual rulers 12–18 can vary for the measuring device 10 and still maintain the inventive concept of this invention.

The measuring device 10 further includes a fastener 44 attached to the rulers 12–18 to rotatably engage the rulers 12–18 to each other. In one embodiment, the fastener 44 attaches to the first protrusion 22, second protrusion 26, third protrusion 30, and fourth protrusion 34, to rotatably engage the rulers 12–18. The fastener 44 further includes a center of axis 46 about which each ruler 12–18 rotates. This center of axis 46 and the fastener 44 provides a central location in which to maintain the correct alignment of the graduated markings 20, 24, 28, and 32 of the measuring device 10. The fastener 44 can also be described as rotatably engaging consecutive rulers 12–18 to provide connection between the rulers 12–18.

Figure 4:
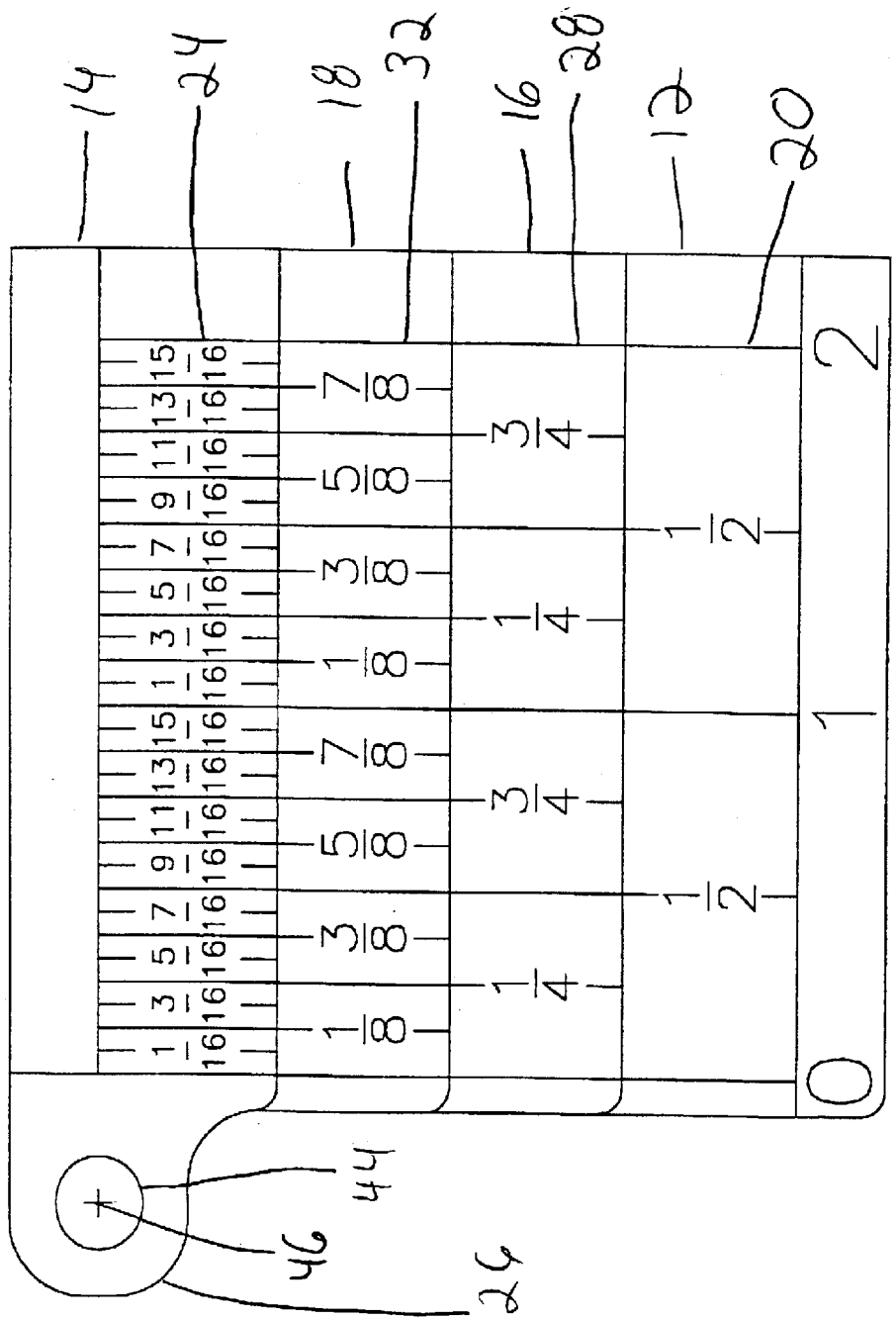
FIG. 4 is a portion of a front view showing one embodiment of the current invention.
Figure 5:
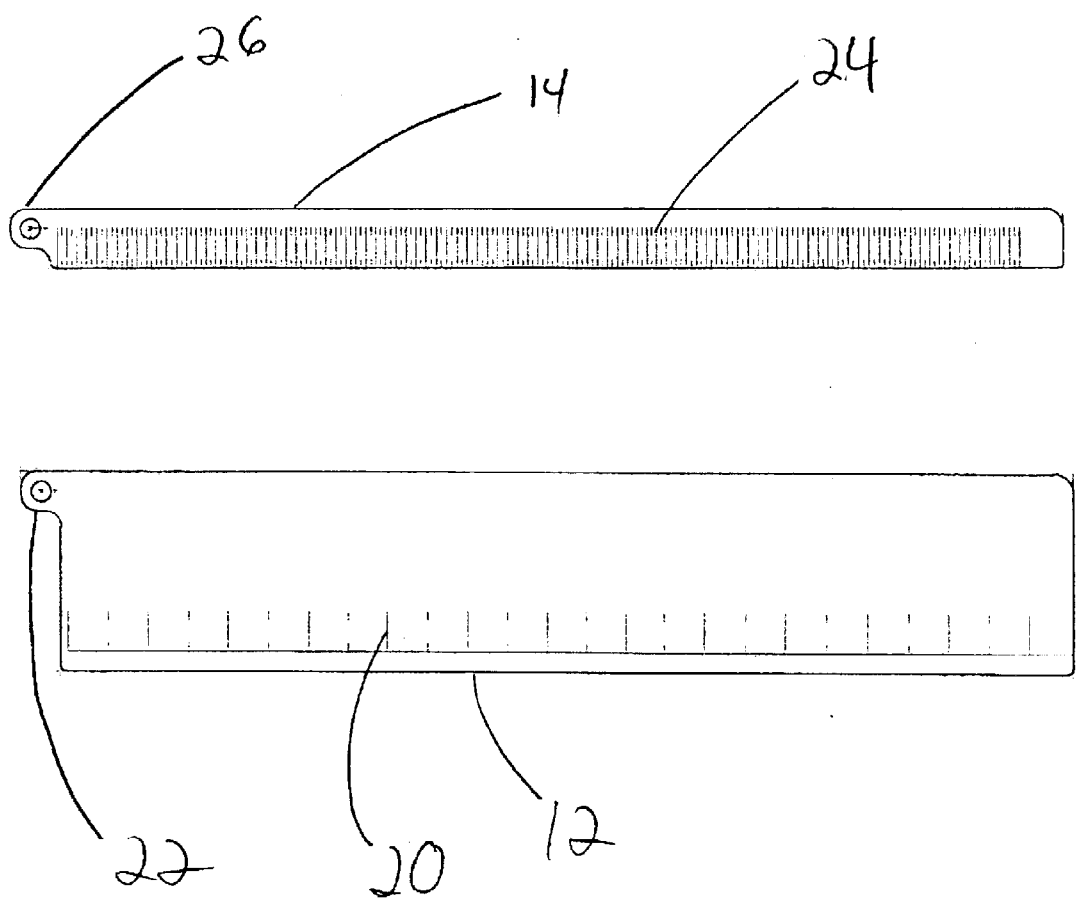
FIG. 5 is a front view of two of the measuring elements of the current invention.

As seen in FIG. 4, in a preferred embodiment the graduated markings 20, 24, 28, and 32 vary in numerical increment between each set of graduated markings. This variation provides an ideal measuring device 10 for teaching the interrelationship between various measurement lengths. For example, as shown in FIG. 4, one embodiment of the measuring device 10 can differentiate whole numbers to fractional halves, fourths, eighths, and sixteenths.

The measuring device 10 can be comprised of plastic, polyurethane, polyethylene, or other material known by one skilled in the art to be lightweight yet resilient.

Each ruler 12–18 of the measuring device 10 can vary in color. This color variance provides easier viewing of the measuring device 10 by the user of measuring device 10. This color variance also further facilitates the educational aspects of the measuring device 10.

The measuring device 10 can also be described as comprising a fastener 44 and a parality of rulers to 12–18. Each ruler containing graduated markings 20, 24, 28, and 32. Each ruler 12–18 is rotatably attached to the fastener 44 such that each ruler 12–18 is positioned to horizontally align and vertically juxtaposed the graduated markings 20, 24, 28, and 32 of consecutive rulers 12–18. An important aspect of the measuring device 10 is the horizontal alignment of the graduated markings 20, 24, 28, and 32 while maintaining the vertical spacing of the same graduated markings 20, 24, 28, and 32. The plurality of rulers 12–18 are rotatably hinged and aligned so as to display the graduated markings 20, 24, 28, and 32 on the individual rulers 12–18 in a stacked arrangement while retaining individual viewing plans for each ruler 12–18 in the measurement device 10 for a user of the measurement device 10.

In a preferred embodiment, the first protrusion 22, second protrusion 26, third protrusion 30, and fourth protrusion 34 include locating fixtures 48 positioned on the protrusions 20, 26, 30, and 34 to removably fix the rulers 12–18 in a position such that the graduate markings 20, 24, 28, and 32 are horizontally aligned and vertically juxtaposed to each other. These location fixtures 48 can include numerous fixtures known in the art to removably secure a location of an element including, but not limited to, knobs and apertures, notches, extensions, springs, gears, and the like. These location fixtures 48 can in essence ("snap-in") place each ruler 12–18 to facilitate the comparison of the markings.

Thus, although there have been described particular embodiments of the present invention of a new and useful Measuring device for Teaching Instrumental Measurements, it is not intended that such references be construed as limitations upon the scope of this invention except as set forth in the following claims.

What is claimed is:

1. A measuring device comprising:
    a first ruler including a first set of graduated markings and a first protrusion; and
    a second ruler including a second set of graduated markings and a second protrusion, the second protrusion rotatable attached to the first protrusion to horizontally align and vertically space the first set of graduated markings with the second set of graduated markings when the first ruler is positioned proximate to the second ruler, and
    wherein the first ruler can rotate 360 degrees with respect to the second ruler.

2. A measuring device for teaching incremental measurements, comprising:
    a first ruler including a first set of graduated markings and a first protrusion;
    a second ruler including a second set of graduated markings and a second protrusion, the second protrusion rotatable attached to the first protrusion to horizontally align and vertically space the first set of graduated markings with the second set of graduated markings;
    a third ruler including a third set of graduated markings and a third protrusion, the third protrusion rotatably attached to the first protrusion and the second protrusion to horizontally align and vertically space the third set of graduated markings with the first set and second set of graduated markings;

a fourth ruler including a fourth set of graduated markings and a fourth protrusion, the fourth protrusion rotatably attached to the first protrusion, the second protrusion, and the third protrusion to horizontally align and vertically space the fourth set of graduated markings with the first set, second set, and third set of graduated markings, and wherein each ruler is positioned in a rotational plane and each rotational plane is parallel to the other rotational planes and each ruler can rotate 360 degrees with respect to the other rulers.

* * * * *